Figure 1:
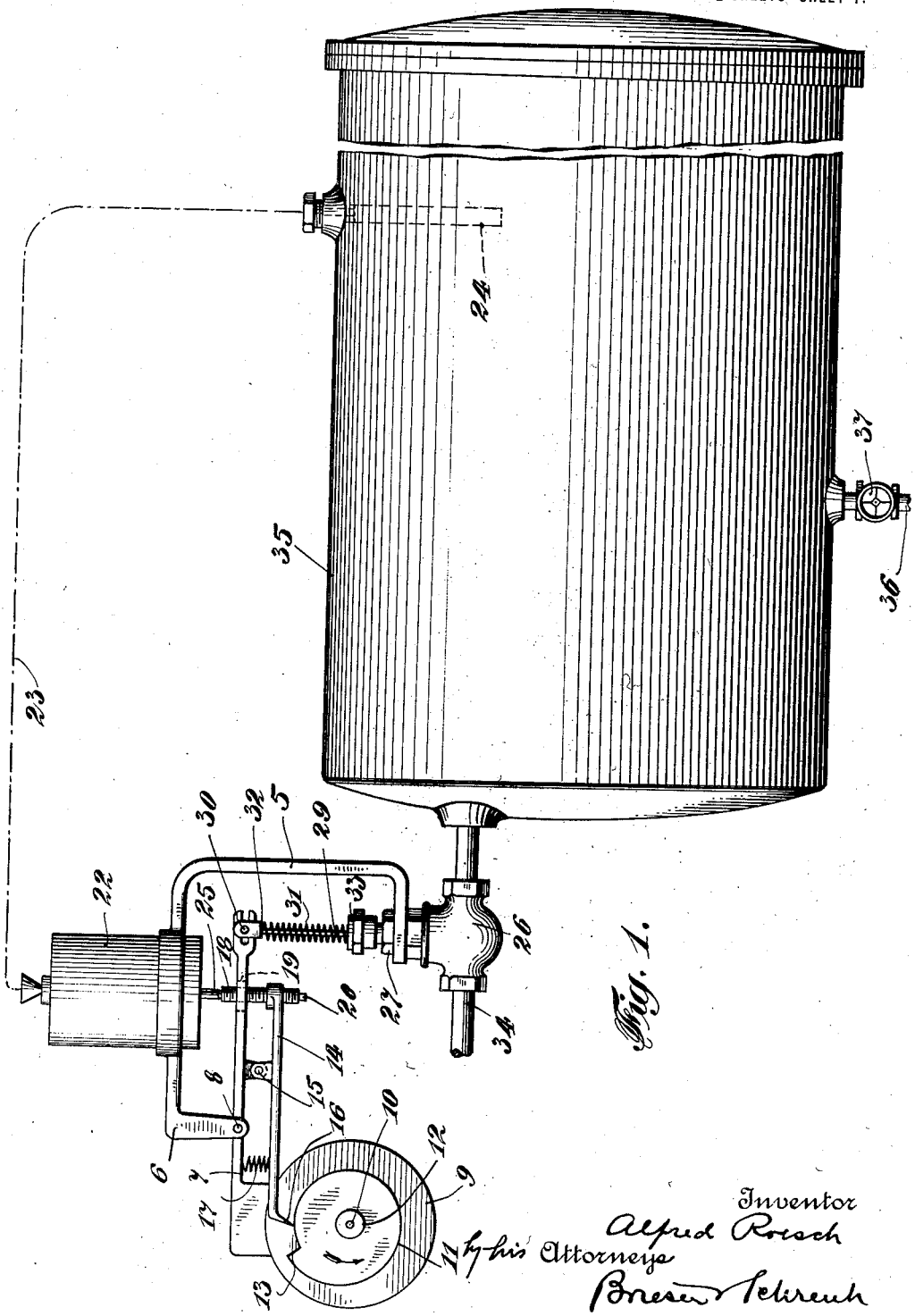

A. ROESCH.
TEMPERATURE CONTROLLER.
APPLICATION FILED AUG. 28, 1920.

1,388,894.

Patented Aug. 30, 1921.
2 SHEETS—SHEET 1.

Inventor
Alfred Roesch
by his Attorneys
Breser & Schrenk

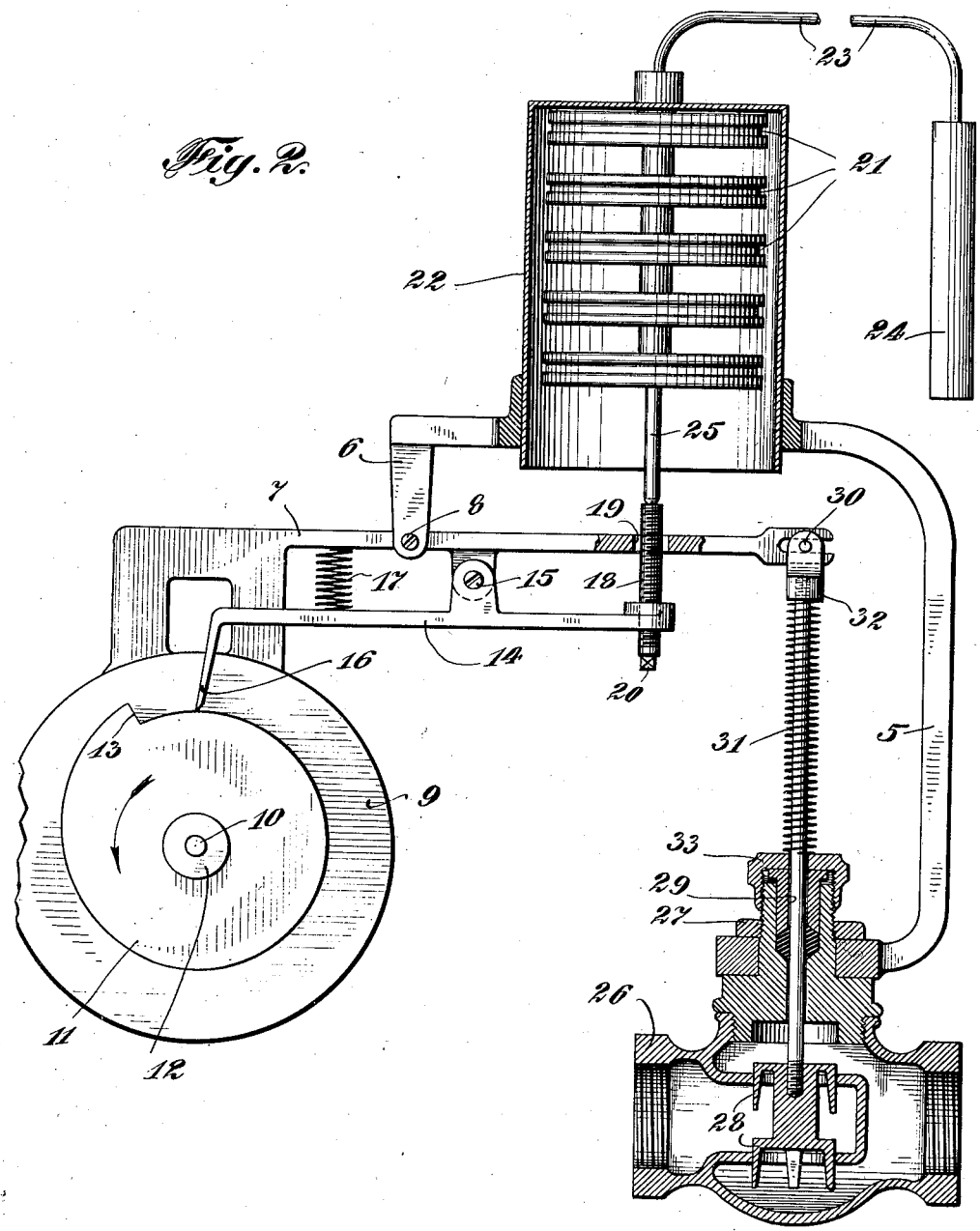

UNITED STATES PATENT OFFICE.

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

TEMPERATURE-CONTROLLER.

1,388,894. Specification of Letters Patent. Patented Aug. 30, 1921.

Application filed August 28, 1920. Serial No. 406,738.

*To all whom it may concern:*

Be it known that I, ALFRED ROESCH, a citizen of the United States, and a resident of the borough of Brooklyn, county of Kings, city and State of New York, have invented certain new and useful Improvements in Temperature-Controllers, of which the following is a specification.

My invention relates to controlling devices and more particularly to that type thereof whereby predetermined conditions of temperatures, in accordance with a predetermined curve, are produced at a given point within a given period of time. The object of my invention is to provide a device of the indicated type which is of simple construction and whereby a fluid controlling valve is directly operated in an efficient and automatic manner. Other objects will appear from the description hereinafter and the features of novelty will be pointed out in the appended claims.

In the accompanying drawings, an example of the invention is shown in operative combination with a vulcanizer, it being understood that this is for the purposes of description and illustration only and without any intent to define the limits of the invention; in said drawings, Figure 1 is an elevation, and Fig. 2 is a sectional elevation of the controller on an enlarged scale.

As shown in the drawings the controller comprises a support which in the illustrated example takes the form of a bracket 5 and is provided with a lug 6 on which a main lever 7 is pivoted at 8. The main lever 7 carries time controlled mechanism in the form of a clock movement 9 or its equivalent, upon the spindle 10 of which a cam 11 is mounted and secured in any suitable manner, and preferably by means of a lock nut 12 so as to be readily removable from said spindle. The cam 11 in every instance has the characteristics of a predetermined time and temperature curve and corresponds in form to the temperature curve which is desired and always constitutes a means whereby the temperatures actually set up are regulated in accordance with said temperature curve and brought back into conformation therewith if any departure from said temperature curve occurs; in the present instance said cam is shown, by way of illustration, in the simplest form, that is with a periphery of gradually increasing radius which begins and terminates at the radial section 13. A secondary lever 14 is pivoted at 15 upon the main lever 7 and is provided with a finger 16 which rides upon the cam 11 and is maintained in engagement therewith by means of a spring 17 located between and bearing against both levers 7 and 14.

The secondary lever 14 carries an adjusting screw 18 which projects through an opening 19 in the main lever 7, the opening 19 being sufficiently large to permit the screw 18 to move freely, relatively to said main lever; to facilitate the adjustment of the screw 18 it may be provided with an angular head 20 for the accommodation of a key or other suitable implement. In its illustrated form the controller further comprises a series of superimposed bellows or capsular springs 21 suspended within a shell or the like 22 which is secured to or forms part of the bracket 5; the bellows are in communication with each other and are connected by means of a capillary tube 23 with a bulb 24, the bellows, tube and bulb being filled with a fluid in the customary manner. The one terminal bellows is provided with a depending rod or other projection 25 which is located in alinement with the adjusting screw 18.

In the illustrated example the bracket 5 is secured upon the bonnet of a valve casing 26 by means of a nut 27, the valve 28 in said casing being of any conventional form and being carried by a stem 29 which is pivotally connected at 30 with the main lever 7 as shown; a coil spring 31 surrounds the stem 29 and by bearing respectively against a shoulder 32 on the latter and against the stuffing box 33 of the valve casing 26, serves to normally maintain the valve 28 in its open position and to return it thereto.

In the installation chosen for descriptive and illustrative purposes the valve 28 controls a pipe 34 whereby steam or other agent is conducted to the vulcanizer 35 which may be of any suitable construction and which may, as shown, be provided with a condensation outlet 36 controlled by means of a manually actuated valve 37; as shown in Fig. 1, the bulb 24 is located within the vulcanizer 35 so as to be responsive to the temperatures actually set up therein.

Assuming that the screw 18 has been properly adjusted and that a cam 11 of the form shown has been attached to the clock spindle 10, the operation is as follows:

The clock 9 or other time controlled mechanism rotates the cam 11 in the direction of the arrow causing the finger 16 of the secondary lever 14, which bears upon said cam, to move upward and follow the incline thereof; because of the fact that the clock 9 and cam 11, as well as the secondary lever 14, are all carried by the main lever 7, this actuation of the finger 16 compresses the spring 17 between the levers 7 and 14 and causes an independent pivotal movement of the secondary lever 14 relatively to the main lever 7 whereby the adjusting screw 18 is moved in a direction away from the rod 25 of the bellows 21. As this occurs the weight of the clock and cam assisted by the tension of the spring 31 which is continuously exerted upon the main lever 7 through the valve stem 29 moves the latter in an axial direction and thereby swings both levers 7 and 14, with the clockwork 9 and cam 11 as a unit, on the pivot 8, and thus maintains the screw 18 in engagement with the rod 25, this causes the valve 28 to be opened to an extent corresponding to the extent to which the cam 11 has previously moved the said adjusting screw 18 in a direction away from the rod 25. In other words, the cam 11 and spring 17 govern the relative positions of the screw 18 and the right-hand end of the lever 7, the screw 18 and the lower end of the rod 25 being, in effect, in contact continuously. As the cam 11 moves the screw 18 in a direction away from said rod 25, the weight of the clock and the tension of the spring 31 tend to rotate the system and operate the valve 28 in the manner previously described. This brings about an increase in temperature in the vulcanizer 35 which affects the bulb 24 and expands the fluid therein and as a result causes an expansion of the bellows 21 and exerts a push in an axial direction upon the rod 25 which is communicated to the adjusting screw 18. Because of the fact that the spring 17 is much stronger than the spring 31, this actuation of the screw 18 swings the levers 14 and 7 and their connected parts as a unit and thereby compresses the spring 31 and at the same time shifts the stem 29 in an axial direction to move the valve 28 toward its closed position and thus reduce the amount of steam which passes into the vulcanizer to such an extent that the temperature therein will be checked against passing beyond the temperature set on the cam 11 by the clock movement 9 at the time. The continued rotation of the cam 11 now again swings the lever 14 to move the screw 18 away from the rod 25 whereby the valve 28 is again opened as previously described to an extent corresponding to the distance the screw 18 was moved away from said rod by the action of said cam 11. The alternate shifting of the valve 28 to periodically increase and decrease the volume of steam entering the vulcanizer 35 is repeated throughout the operation of the apparatus, each increase of temperature acting upon the bulb 24 which acts to check the temperature from rising too high or beyond the setting point called for by the particular part of the cam 11 with which the finger 16 is in contact at the time. In the illustrated example the contour of said cam calls for a gradual rise in temperature from a minimum to a maximum point during a given period of time or in other words, during the time it takes for the cam to make a complete revolution to bring the section 13 back to the starting point.

If for any reason, such as rapid condensation, the temperature in the vulcanizer should be reduced, the bulb 24 would be affected thereby and would cause a collapse of the bellows 21 thus moving the rod 25 away from the screw 18 and permitting the spring 31 to increase the opening of the valve 28 and thereby bringing the temperature back to the point set by the cam 11. In other words, the operation of the controlling mechanism is independent and is free to open and close the valve 28 to maintain the temperature set by the cam 11.

At the end of the particular vulcanizing or other operation, which, in the illustrated example, is coincident with the end of a complete revolution of the cam 11, the finger 16 drops from the high point of the cam to the low point thereof along the radial section 13 or operates in an equivalent manner and thus brings about a complete closing of the valve 28, thus automatically cutting off the steam supply to the vulcanizer 35. By substituting cams of the required contour, temperature conditions in accordance with any predetermined temperature curve, may be automatically maintained in the vulcanizer or at any other point without requiring any attention on the part of an operator or attendant.

The controller is extremely simple in construction and efficient in operation and may be used whereby temperature conditions within a given period of time are to be regulated and does away with the necessity for constant attention on the part of an operator.

It will be understood that the essential parts of the apparatus are represented by the clockwork or other time controlled mechanism 9, the bellows 21 or their equivalents, the sensitive member or bulb 24 and the valve 28 and that the cam 11 and levers 7 and 14 may be replaced by devices or mechanism of different type and arrangement, the controller in all of its forms comprising what may be termed a self-contained instrument in which no extraneous agency is required to actuate the control valve 28.

Various changes in the specific form shown and described may be made within the scope of the claims without departing from the spirit of my invention.

I claim:

1. The combination of a valve casing, a valve therein, a bracket carried by said casing, a main lever pivotally mounted on said bracket and connected directly with said valve, a clock work carried by said main lever, a cam mounted on said clock work and operated thereby, a secondary lever pivotally mounted on said main lever and engaging said cam, a spring located between and engaging said levers for moving said secondary lever relatively to said main lever, an adjusting screw carried by said secondary lever, a series of connected bellows mounted upon said bracket, a rod projecting from said bellows in alinement with said adjusting screw, a temperature sensitive bulb connected with said bellows and a spring tending to move said valve toward its open position and to pivotally swing said levers, clockwork and cam as a unit.

2. The combination of a valve casing, a valve therein, a bracket carried by said casing, a main lever pivotally mounted on said bracket and connected directly with said valve, a clock work carried by said main lever, a cam mounted on said clock work and operated thereby, a secondary lever pivotally mounted on said main lever and engaging said cam, a spring located between and engaging said levers for moving said secondary lever relatively to said main lever, an adjusting screw carried by said secondary lever, temperature sensitive means arranged in coöperative relation to said adjusting screw and a spring tending to move said valve toward its open position and to pivotally swing said levers, clockwork and cam as a unit.

3. A controller of the kind described comprising a supporting bracket, a main lever pivoted thereon, a clock work carried by said main lever, a cam mounted on said clock work and actuated thereby, a secondary lever pivoted on said main lever and engaging said cam, a spring located between and engaging said levers, an adjusting screw carried by said secondary lever, a shell carried by said bracket, a series of connected bellows suspended in said shell, a rod projecting from one terminal bellows in alinement with said adjusting screw, a temperature sensitive bulb connected with the other terminal bellows, a valve positively connected with said main lever and a spring tending to move said valve toward its open position and to pivotally swing said levers, clockwork and cam as a unit.

In testimony whereof I have hereunto set my hand.

ALFRED ROESCH.